United States Patent [19]

Blinc et al.

[11] Patent Number: 5,040,877

[45] Date of Patent: Aug. 20, 1991

[54] LOW LOSS LIQUID CRYSTAL MODULATOR FOR COLORING AND SHAPING A LIGHT BEAM

[75] Inventors: Robert Blinc, Ljubljana, Yugoslavia; J. William Doane, Kent, Ohio; Bojan Marin, Ljubljana, Yugoslavia; Igor Musevic, Ljubljana, Yugoslavia; Janez Pirs, Ljubljana, Yugoslavia; Silva Pirs, Ljubljana, Yugoslavia; Slobodan Zumer, Ljubljana, Yugoslavia; Samo Kopac, Naklo, Yugoslavia

[73] Assignee: Kent State University, Kent, Ohio

[21] Appl. No.: 128,986

[22] Filed: Dec. 4, 1987

[51] Int. Cl.⁵ .................. G02F 1/133; G03B 21/00; G03B 21/26
[52] U.S. Cl. .................................. 359/63; 353/31; 353/34; 353/122; 359/84; 359/53
[58] Field of Search .......... 350/334, 335, 337, 331 R; 353/34, 48, 49, 122, 31

[56] References Cited

U.S. PATENT DOCUMENTS

| | | | |
|---|---|---|---|
| 3,449,045 | 6/1969 | Roux | 353/34 |
| 4,127,322 | 11/1978 | Jacobson et al. | 353/34 |
| 4,417,253 | 11/1983 | Jacks | 350/173 |
| 4,472,737 | 9/1984 | Iwasaki | 350/335 |
| 4,699,468 | 10/1987 | Harasim et al. | 350/335 |
| 4,786,146 | 11/1988 | Ledebuhr | 350/337 |
| 4,796,978 | 1/1989 | Tanaka et al. | 350/337 |
| 4,850,658 | 7/1989 | Kamakura et al. | 350/397 |
| 4,904,061 | 2/1990 | Aruga | 353/31 |
| 4,909,601 | 3/1990 | Yajima et al. | 353/31 |
| 4,935,758 | 6/1990 | Miyatake et al. | 353/31 |
| 4,943,154 | 7/1990 | Miyatake et al. | 353/31 |

Primary Examiner—Stanley D. Miller
Assistant Examiner—Anita Pellman Gross
Attorney, Agent, or Firm—Watts, Hoffman, Fisher & Heinke

[57] ABSTRACT

The invention provides a low loss liquid crystal modulator for coloring and shaping a light beam wherein liquid crystal light modulators provide continuous variation in color and intensity output by controlled scattering; the liquid crystal light modulators comprise addressable sheets of light-wave-length size liquid crystal occlusious in a transparent matrix; the modulators employ nematic liquid crystal exhibiting positive dielectric anisotropy; the modulator is employed in varying and coloring output beams to allow for colored data or video transmission; images produced may vary in time as is required for, e.g., color television; the modulator is employed in color projectors for both data and video projection, for color printing, and for colored stage illumination. Low loss transmission of the modulators provides for bright images which can be viewed under high ambient illumination.

23 Claims, 6 Drawing Sheets

LOW LOSS LIQUID CRYSTAL MODULATOR FOR COLORING AND SHAPING A LIGHT BEAM

TECHNICAL FIELD

This invention relates to a modulator for coloring and shaping a light beam and more particularly to a continuously varying modulator wherein a liquid crystal light modulator regulates with low loss by controlled scattering the intensity of an incoming light beam; such a modulator may be employed in video data projection to produce bright images on large screens which can be viewed under high ambient illumination or can be used for reproduction of color photographs or stage illumination.

BACKGROUND ART

Light beam modulators employing color separating mirrors are known. For instance, Balzers AG, Liechtenstein, discloses a broadband printer for film printing wherein three dichroic mirrors are placed in an incoming achromatic light beam to split the beam into 3 channels, one for each primary color. A diaphragm is mounted in each channel to control the intensity of the beam by means of a controlled aperture. The exiting light beams from the various channels are recombined into a single outgoing light beam by three more dichroic mirrors placed in the paths of the respective exiting light beams.

This type of modulator operates by sequential formation of color and lacks the capability continuously to regulate color in the outgoing beam; resultant color can be only of a primary or mixture of primary colors. The response time of such a modulator and its reliability of operation are limited by the mechanical or electromechanical components of the diaphragm, and time varying video data projection is not possible. Additionally, since the mechanical diaphragms absorb the light which does not pass through the aperture, the modulator can exhibit heating.

A sequential coloring display employing a liquid crystal cell is disclosed in British patent application GB 2 162 356. Achromatic light is passed through a dichroic polarizer to an electrically switchable liquid crystal cell, so that, in the absence of a field, one component of polarized incident light is rotated 90° by the cell, or, in the presence of a field, is transmitted unrotated. The liquid crystal cell is of the pi-type; a twist-cell-type liquid crystal cell may also be employed. The light finally emerging from the cell is passed through a neutral polarizer. The sequential character of the coloring procedure as well as the use of polarizers result in a high loss of light, only about 10% of the incoming achromatic light being transmitted.

SUMMARY OF THE INVENTION

The invention provides a low loss liquid crystal modulator for coloring and shaping a light beam wherein liquid crystal light modulators provide continuous variation in color and intensity output by controlled scattering; the liquid crystal light modulators comprise addressable sheets of light-wave-length size liquid crystal occlusions in a transparent matrix; the modulators employ nematic liquid crystal exhibiting positive dielectric anisotropy; the modulator is employed in varying and coloring output beams to allow for colored data or video transmission; images produced may vary in time as is required for, e.g., color television; the modulator is employed in color projectors for both data and video projection, for color printing, and for colored stage illumination. Low loss transmission of the modulators provides for bright images which can be viewed under high ambient illumination.

The use of liquid crystal light valves as shutters or active matrices which exploit the light scattering properties of light-wave-length size liquid crystal occlusions provides a number of advantages over both mechanical diaphragms and twist or pi-cell liquid crystal cells which require polarizers. The liquid crystal light shutters or active matrices are scattering rather than absorbing so that no energy is absorbed, thereby obviating heating of the components of the modulator. There being no need for polarizers, the modulator exhibits less light loss which results in brighter images and colors while using less intense and less costly light sources. The light shutters or active matrices are switchable with relative low voltages and driving power, thus enabling the use of optoelectronic controls which are compatible with solid state electronics.

The method by which the liquid crystal is occluded in the matrix determines the effectiveness of the light valve, which in turn depends on the intended use of the modulator. While mechanical imbibement in microporous plastic sheets as disclosed in U.S. Pat. Nos. 4,048,358 to Shanks and 4,411,495 to Beni et al., yields valves which may function in the desired manner, the resultant valves impart limitations to the degree of contrast exhibited by the valve thereby compromising the versatility in the coloring of a light beam. The techniques of mechanical imbibement and entrapment of microdroplets of liquid crystal in a liquid also call for protective surfaces to seal in the liquid crystal and protect it from atmospheric contact.

The emulsification technique taught in French Patent No. 2,139,537 to Elliott, and U.S. Pat. No. 4,435,047 to Fergason has advantages of yielding valves which exhibit improved contrast over those prepared by mechanical imbibement, but the emulsification or encapsulation technique is still essentially one of mechanical entrapment of the liquid crystal into a synthetic matrix; the control of droplet size, uniformity, and spacing is limited, offering poor control over film optimization.

The by far preferred and ideal technique is that disclosed in U.S. Pat. Nos. 4,688,900 to Doane et al., and 4,685,771 to West, et al., the disclosures of which are incorporated by reference, wherein sheets of light transmissive synthetic resin matrix containing a multitude of light-modulating discrete microdroplets of liquid crystal are prepared by phase separating a homogeneous solution of matrix providing material and liquid crystal. Such light modulating materials are referred to as Polymer Dispersed Liquid Crystal (PDLC) materials and light shutters or active matrices employing such materials as PDLC shutters or PDLC active matrices. The advantage of PDLC materials are ease of preparation, control over droplet size, uniformity and spacing for improved shuttering, and the use of a wide variety of polymers for index of refraction matching and mismatching of liquid crystal to matrix for special application, as disclosed in U.S. patent application Ser. No. 060,184, filed June 9, 1987, the disclosure of which is incorporated by reference.

Accordingly, the invention provides a modulator for coloring and/or shaping a light beam and comprises means for directing incoming light into a plurality of channels; liquid crystal light modulating means for selectively modulating light located in at least one of the channels, the light modulating means including a synthetic resin matrix containing positive dielectric anisotropic liquid crystal microdroplets; and addressing means for addressing the matrix to control the transmission of light through the matrix. The means for directing incoming light into the plurality of channels may comprise a single light source; in this case the modulator includes beam splitting means for splitting the incoming light into a plurality of differently colored channels. The means for directing incoming light may comprise two or more light sources directed to deliver light into the plurality of channels. The modulator may also comprise beam reintegrating means for intercepting and combining the outputs of the channels into a single outgoing colored light beam. The modulator may further comprise means for positioning the light modulating means so that the virtual images of the output of the channels coincide in the single outgoing colored light beam. An additional downstream liquid crystal light modulating means may be located in the path of the single outgoing colored light beam. The addressing means may comprise laser beam means or electron beam means to achieve time varying, high resolution video data images on the PDLC light modulator. This is done either in a manner similar to that described in U.S. Pat. No. 4,685,771 wherein a laser beam is employed to thermally address the PDLC light modulator or photoelectrically with the help of a laser beam falling on a photodiode, photocell, or photoconductive material incorporated in each picture element.

Where the liquid crystal light modulating means is to function as a light shutter, the addressing means may comprise electrode means for establishing an electric field across the matrix and circuit control means operatively connected to the electrode means for selectively modulating the light passing through the modulating means whereby the modulating means is transmissive in the presence of an electric field and is non-transmissive in the absence of an electric field, and wherein the strength of the electric field and the resulting transmissivity of the modulating means is selectively controllable through the circuit means; in this case the electrode means may include segmental portions which are selectively energizable by the circuit means in order to shape the cross-section of the light passing through the modulating means. The ratio of light transmitted through the modulator between the transmissive state and opaque state is approximately 1:100. Submillisecond switching times are possible. Where the liquid crystal light modulating means is to function as an active matrix addressing means may comprise semiconductor means to define the active matrix with a plurality of picture elements. Preferably the liquid crystal light modulating means is one wherein the liquid crystal microdroplets in the synthetic film matrix are spontaneously formed from solution in the matrix-forming-composition during solidification thereof as is disclosed in U.S. Pat. No. 6,685,771 and 6,688,900. Most preferably liquid crystals comprise nematic-type cyanobyphenyls.

These and other features will be more fully apparent from the following detailed description taken in connection with the accompanying drawing.

BRIEF DESCRIPTION OF THE DRAWING

FIG. 2 is a schematic diagram of a full color video projection system;

FIG. 3 is a schematic diagram of another full color video projection system;

FIG. 4 is a schematic diagram of a frame sequential video projection system;

FIG. 5 is a schematic diagram of a color photo processing system;

FIG. 6 is a schematic diagram of a stage illumination system;

FIG. 8 is a schematic diagram of another stage illumination system;

FIG. 9 is a schematic diagram of yet another stage illumination system; and

DETAILED DESCRIPTION OF THE DRAWING

Figure 1:
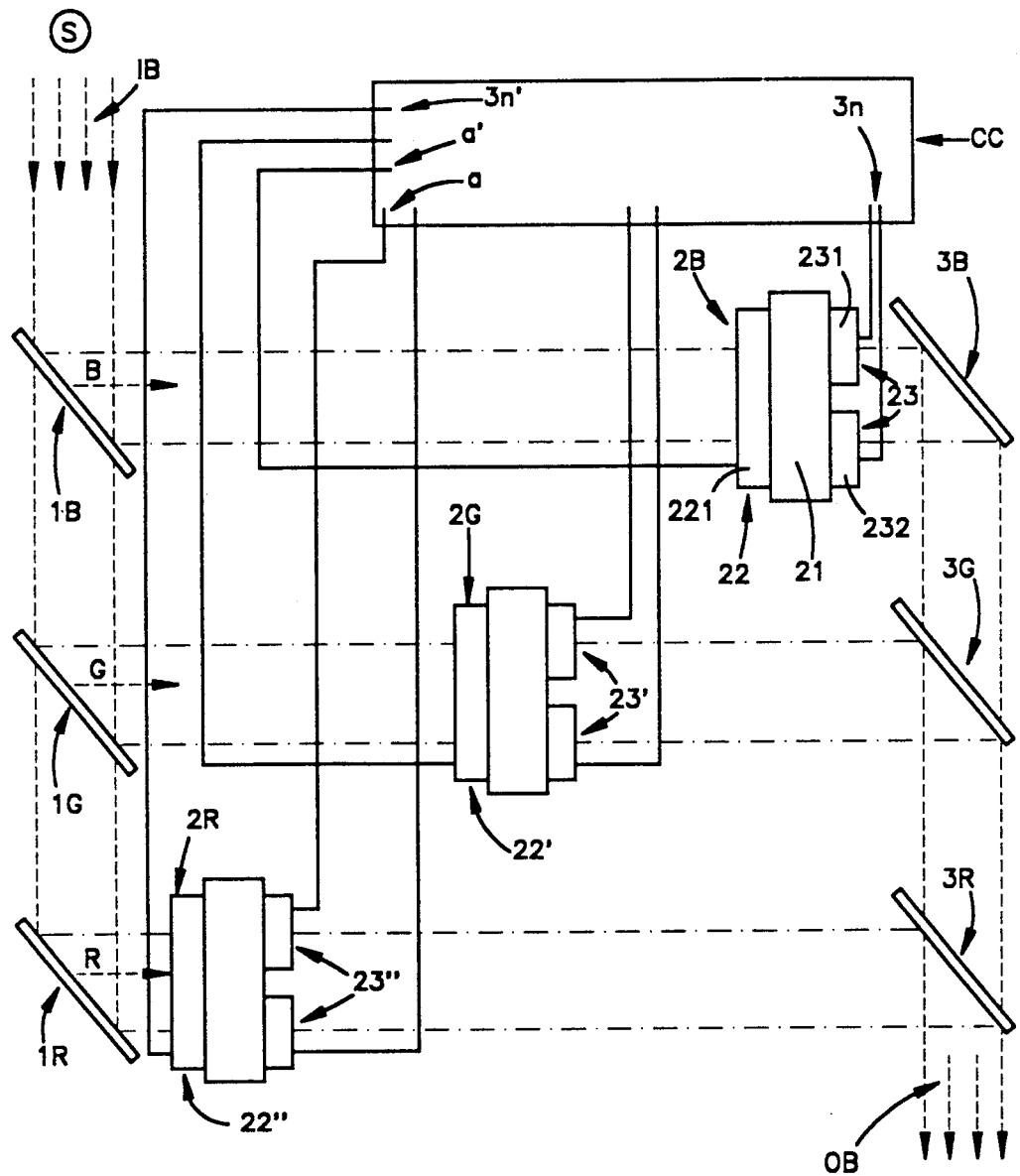
FIG. 1 is a schematic diagram of a liquid crystal modulator for coloring and shaping a single incoming beam of light.

The liquid crystal modulator is shown generally in FIG. 1. There dichroic mirrors 1B, 1G, 1R, one for each of the primary colors are positioned in the path of a collimated beam of incoming light IB. The mirrors 1B, 1G, 1R are arranged so as to split the incoming light IB into three color channels B, G, R. Liquid crystal light modulators 2B, 2G, 2R are located in channels B, G, R to control the shape and intensity of the respective colored light beams transmitted through in each channel. As illustrated in FIG. 1, the liquid crystal light modulators 2B, 2G, 2R are electrically addressable. At the end of channels B, G, R, there are positioned three further dichroic mirrors 3B, 3G, 3R to intercept the light beams coming from the channels B, G, R and to reintegrate the beams into a single outgoing light beam OB. The mirrors 1R and 3B, located at the end of the incoming path and at the beginning of the outgoing path, respectively, can be non-selective plain mirrors.

Representative shutter 2B comprises a light modulating liquid crystal microdroplet dispersion in a light transmissive synthetic resin matrix 21. The matrix 21 is illustrated mounted between transparent electrodes 22, 23. Electrode 22 is illustrated as a single segment 221 and electrode 23 is illustrated as segments 231, 232. It will be appreciated that the electrodes may comprise multiple segments or be patterned, all techniques well known in the art.

A control circuit CC has control outputs a′, ... 3n′ to which the electrodes 22, and corresponding electrodes 22′, 22″ are connected. The control circuit CC also has control outputs a, ... 3n to which electrode 23 and corresponding electrodes 23′, 23″ are connected.

In operation, an incoming achromatic light beam 1B from source S is separated by the dichroic mirrors 1B, 1G, 1R into blue, green and red component beams in channels B, G, R, respectively. Initially, with all control outputs a, a'... 3n, 3n' in the off-state, the light modulators 2B, 2G, 2R are wholly opaque so that the component beams are scattered by the randomly aligned liquid crystal microdroplets in the matrices and no light passes through the shutters. Addressing light modulator 2B, for instance, with a threshold voltage of some tens of volts, between electrodes 221 and 231, for instance, causes the liquid crystal in the microdroplets to align relative to the surface of the matrix 21 in the area between the electrodes 221 and 231; hence the area between electrodes 221 and 231 grows transparent and allows that part of the blue light beam incident on the transparent area to be transmitted and to continue traveling in channel B until intercepted and directed into outgoing beam OB by mirror 3B. The transition between the opaque state and the fully transmissive state is smooth, the degree of transmission being dependent on the applied voltage. Thus matrix 21 can be made fully transparent between electrodes 221 and 231 and semi-transparent between electrodes 221 and 232, and vice versa.

In applications where the addressing means are, e.g., a laser beam, it will be appreciated that the light modulators are not equipped with electrodes and that the control circuit controls the intensity and target area of the impinging beam on the matrix.

Figure 2:
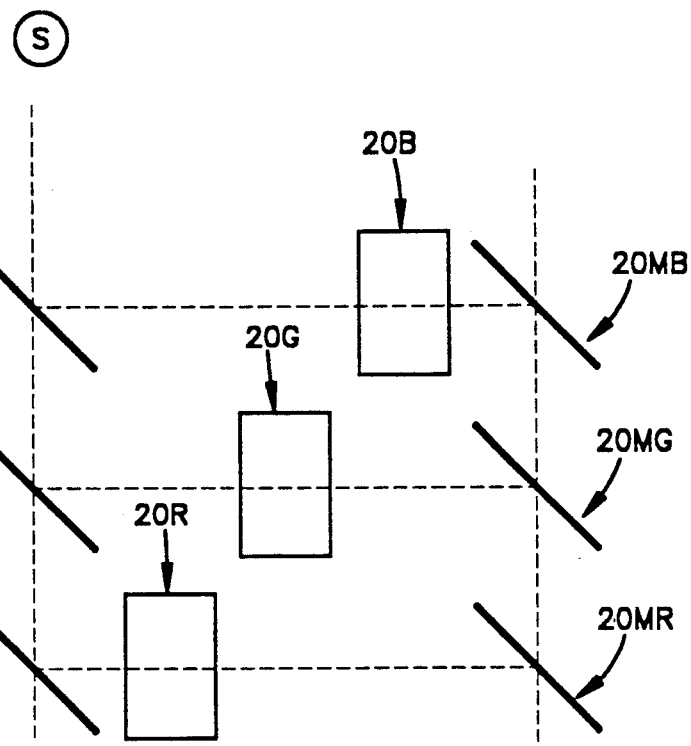
FIGS. 2-6 and 8-9 are schematic diagrams of various applications of the liquid cyrstal light modulator; in these figures cross-hatching indicates an active matrix PDLC light modulator and no cross-hatching indicates a shuttering PDLC light modulator with one or more segmental electrodes.

The alignment of components in a full color video projection system is shown in FIG. 2. In this case, the liquid crystal modulators 20B, 20G and 20R are provided with active matrices wherein the liquid crystal film is addressed by a multitude of semiconductors to define an active matrix with a plurality of picture elements (pixels), a technique known in the art. The modulators 20B, 20G and 20R are positioned so that the virtual images of the patterns reflected by mirrors 20MB, 20MG and 20MR coincide.

Figure 3:
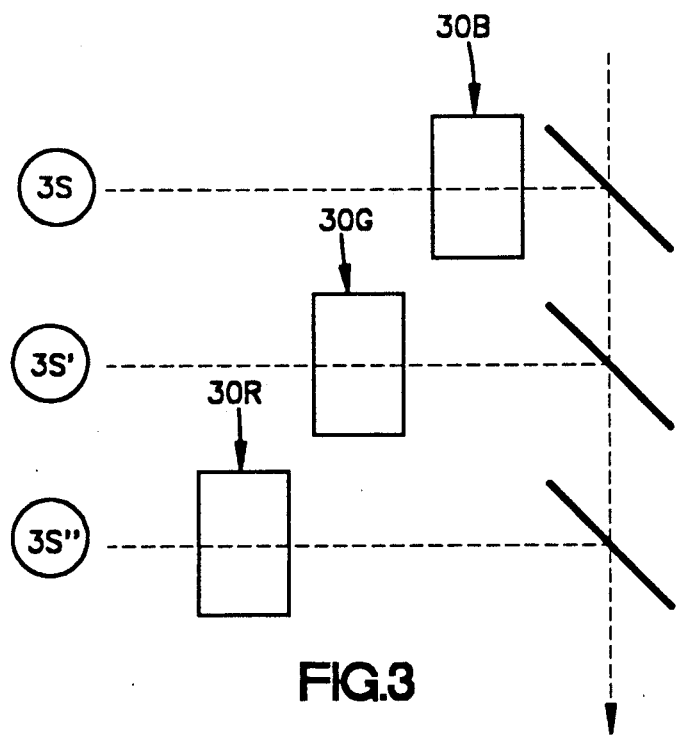

Another full color video projection system is illustrated in FIG. 3 wherein three achromatic light sources 3S, 3S', 3S" are directed at three modulators 30B, 30G, 30R also provided with active matrices. The configurations in FIGS. 2 and 3 have the advantage of minimizing light loss, but have the disadvantage that the requirement of multiple active matrices adds to the cost of the systems.

Figure 4:
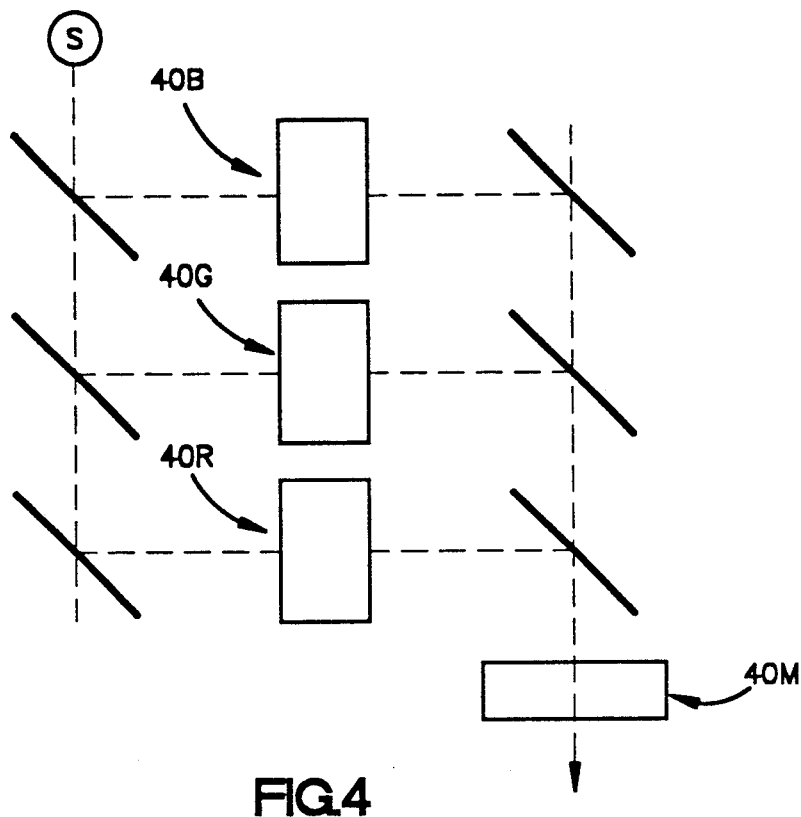

A frame sequential color video projection system is illustrated in FIG. 4. The modulators 40B, 40G and 40R are of the shuttering type wherein the liquid crystal matrix is addressed by one or more segmented electrodes. In this configuration, an additional modulator 40M with an active matrix is placed in the outgoing light beam. This configuration gives about one-third the light intensity of the configurations shown in FIGS. 2 and 3 and requires that the dynamics of the response of the shutters in modulators 40B, 40G and 40R be about three times faster than those in FIGS. 2 and 3. The requirement of only one active matrix in modulator 40M, however, makes the configuration in FIG. 4 less expensive.

Figure 5:
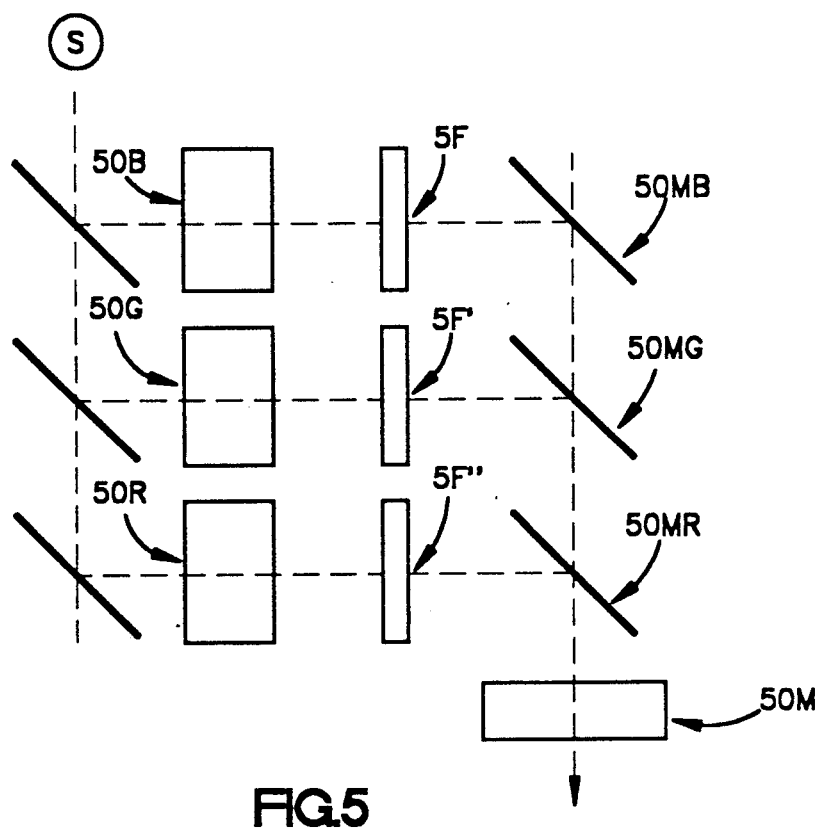

The modulator of the present invention may be employed as a color printer wherein color photographic prints can be made with a single exposure, whereas presently available mechanical color filter devices require three exposures, one for each of the primary colors. A color photo processing system is illustrated in FIG. 5. The modulators 50B, 50G and 50R are of the shuttering type and positioned so that the virtual images of the shutter patterns reflected by mirrors 50MB, 50MG and 50MR coincide. An additional modulator 50M also of the shuttering type is provided in the path of the outgoing light beam to control its final intensity. Color filters 5F, 5F', 5F", of the interference or absorption type may be positioned in the path of colored light exiting the modulators 50B, 50G and 50R to give better colors. Control of light intensity, color and profile are achieved with a microprocessor-based electronic system, as known in the art.

Figure 6:
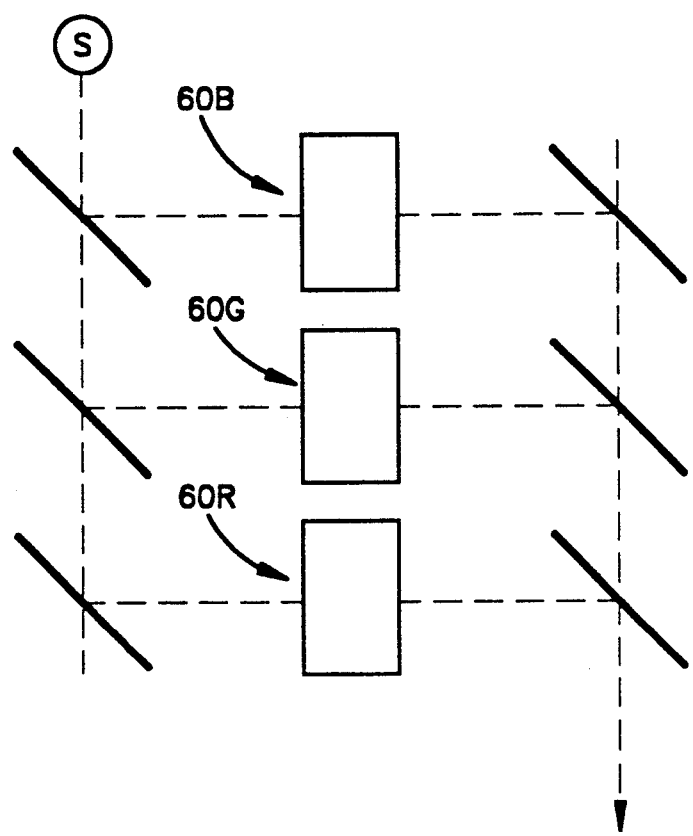
Figure 7:
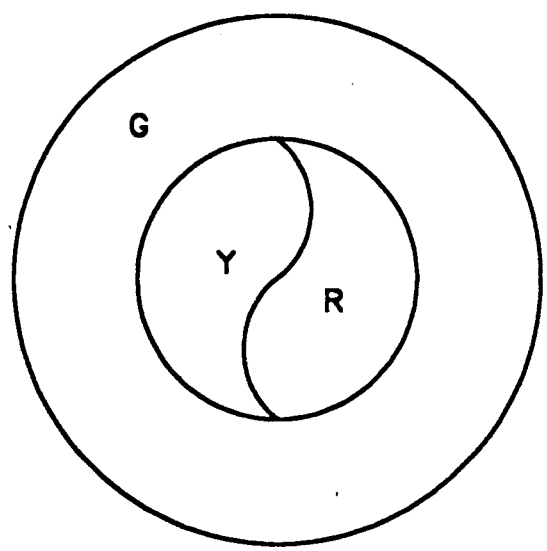
FIG. 7 is an exemplary diagram of a cross-section of an outgoing beam of light from the stage illumination system of FIG. 6.

The modulator of the present invention makes possible completely new color effects for use in, e.g., stage illumination for theater, opera, night club, etc. FIG. 6 illustrates the alignment of components for a stage illumination system wherein modulators 60B, 60G, 60R are of the shuttering type. Inasmuch as the shape and color have of the outgoing light beam cross-section can be varied arbitrarily according to the shape of the electrodes or addressing means, an outgoing light beam generated by a stage illumination system as in FIG. 6 may exhibit the cross-section illustrated in FIG. 7, wherein the outer edge of a circular outgoing beam is green while the center is split between yellow and red, or any such combination.

Figure 8:
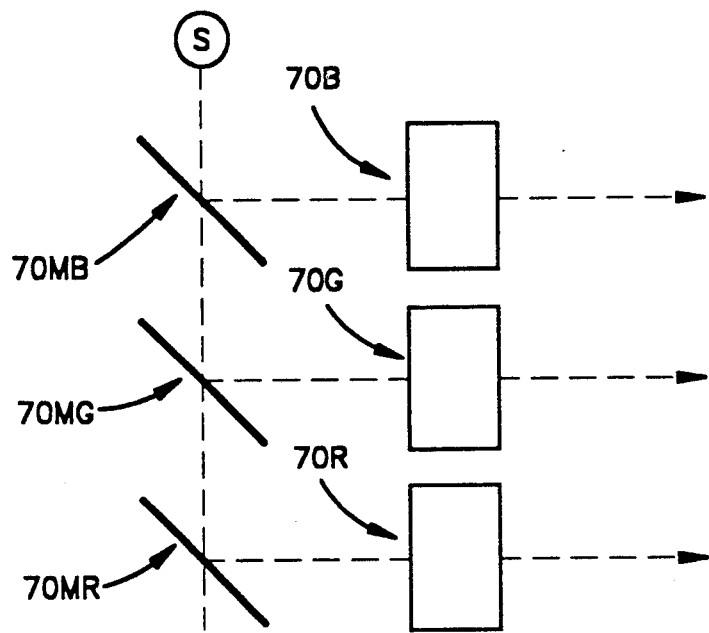
Figure 9:
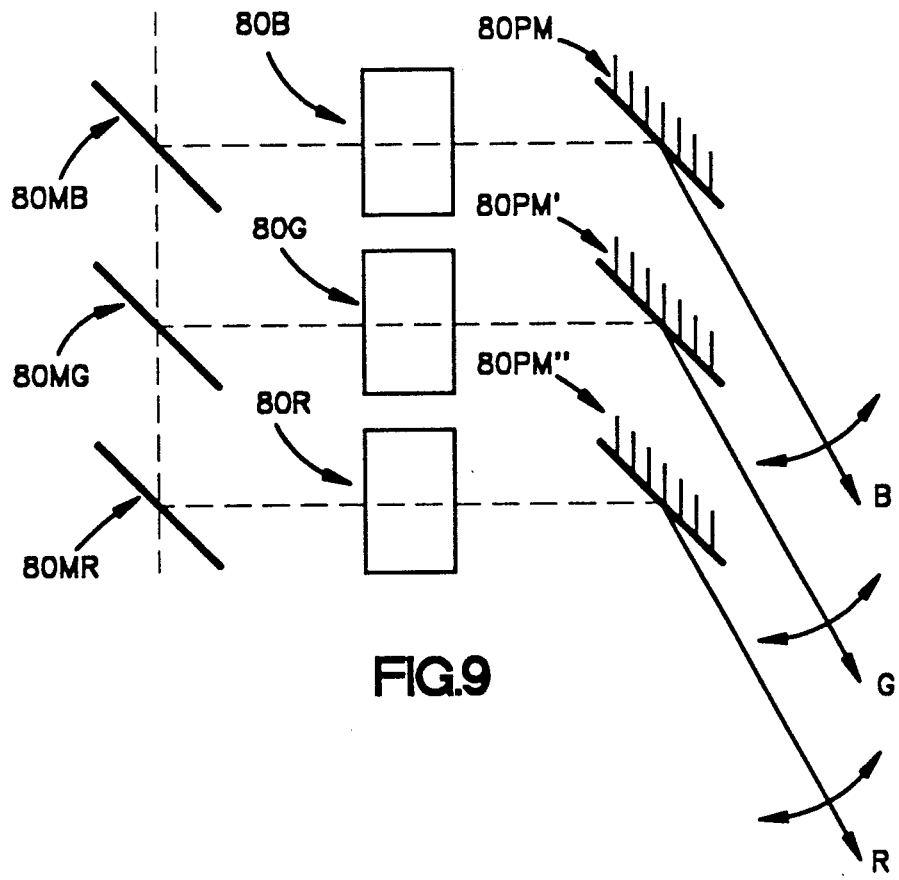

FIG. 8 illustrates an alignment wherein three colored light beams split from source S by mirrors 70MB, 70MG and 70MR are modulated by modulators 70B, 70G, 70R of the shuttering type and are aimed directly at the stage where the beams recombine. The light effects achievable with the configuration of FIG. 8 are not as subtle as achievable with FIG. 6, but the elimination of a set of dichroic mirros makes the system less expensive. FIG. 9 illustrates how the stage illumination system of FIG. 8 can be augmented with plain, rotating mirrors, 80PM, 80PM', 80PM". Achromatic light from source S is split by mirrors 80MB, 80MG, 80MR into three colored channels where it is modulated by shutters 80B, 80G, 80R. The outgoing colored light beams B, G, R are reflected and directed by rotating, plain mirrors 80PM, 80PM', 80PM". The stage illumination device of FIG. 9 creates three independent colored lights from one source.

A principal advantage of all these systems is their high light efficiency. Classical illumination devices have been almost entirely limited to conventional light sources (Wolfram electric bulb) because of the demand for continuous light intensity variation.

All embodiments of the modulator of the present invention provide the required light intensity variations. Light sources such as plasma light from a Xenon arc lamp can be employed which would have about ten times higher light efficiency than conventional sources.

Figure 10:
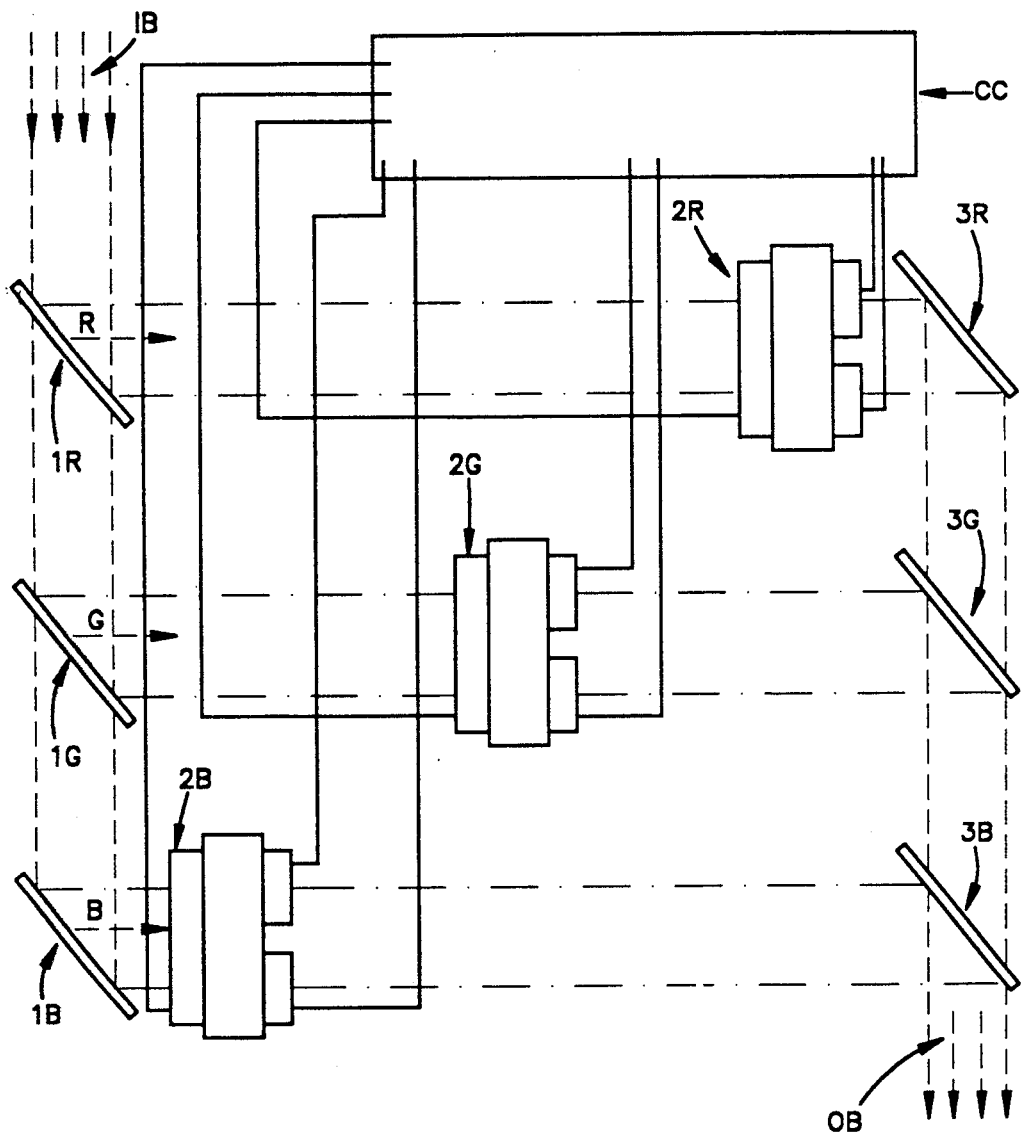
FIG. 10 is a schematic diagram of the liquid crystal light modulator of FIG. 1 with the order of dichroic mirrors reversed.

FIG. 10 illustrates the modulator of FIG. 1, wherein the order of the dichroic mirrors is reversed. The system in FIG. 10 displays somewhat improved light transmission characteristics over those of the system in FIG. 1. All the systems in FIGS. 2-6 and 9 may also have the order of dichroic mirrors reversed.

A suitable liquid crystal light shutter was made according to the methods of U.S. Pat. Nos. 4,685,771 and 4,688,900 wherein a mixture of 20% by weight MK 107, 11% by weight EPON 828, 28% by weight Capcure 3800 and 41% E-7 was placed between 2"×3" glass slides spaced apart at 26$\mu$. The mixture was cured at 75° C. overnight. The size of the resultant microdroplets of liquid crystal was not measured, but was estimated to be less than about 1$\mu$. The glass slides were equipped with standard ITO unpatterned electrodes. The threshold voltage for switching the shutter from opaque to transparent was in the range of 30 to 40 volts; the switching time back to the opaque state after the voltage was removed was about 100 msec. The contrast between the opaque and the transparent state was 100:1. The color separating mirrors in the modulator were Balzars BD 800059 dichroic mirrors (DC blue, DC green, DC red).

Many variations and modifications of the invention will be apparent to those skilled in the art from the above detailed description. Therefore, it is to be understood that, within the scope of the appended claims, the invention can be practiced otherwise than as specifically shown and described.

We claim:

1. A low light loss color projector operative in a transmissive mode to project colored light comprising:
   a) means for separating white light into three unpolarized light channels, each channel being a different color;
   b) liquid crystal light modulating means in each of said light channels;
      i) said liquid crystal light modulating means comprising a transmissive polymer dispersed liquid crystal; and unpolarized light;
   c) addressing means for addressing said liquid crystal light modulating means to selectively control scattering and transmission of said light channels.

2. A color projector according to claim 1 wherein said addressing means comprises a plurality of segmented electrodes.

3. A color projector according to claim 1 wherein said addressing means comprises an active matrix.

4. A color projector according to claim 1 wherein said means for separating white light into color are mirrors including dichroic mirrors arranged upstream from said liquid crystal light modulating means.

5. A color projector according to claim 4 including optical means associated with each channel downstream of said liquid crystal light modulating means for combining the emitted light into a colored projection beam.

6. A low light loss color projector operative in a transmissive mode to project colored light comprising:
   a) means for separating white light into three unpolarized light channels, each channel being a different color;
   b) transmissive polymer dispersed nematic liquid crystal light modulating means in each said light channels, said liquid crystal light modulating means being operative in one mode to transmit light and in another mode to scatter light; and
   c) a laser for addressing said modulating means to selectively control scattering and transmission of said light channels.

7. A low light loss color projector operative in a transmissive mode to project colored light comprising:
   a) means for separating white light into three unpolarized light channels, each channel being a different color;
   b) transmissive liquid crystal light modulating means in each of said light channels, said liquid crystal light modulating means consisting essentially of a transmissive polymer dispersed liquid crystal and being operative in one mode to transmit light and in another mode to scatter light;
   c) addressing means for addressing said modulating means to selectively control scattering and transmission of said light beams; and
   d) a plurality of rotating mirrors downstream of said liquid crystal light modulating means.

8. A low light loss color projector operative in a transmissive mode to project colored light comprising:
   a) means for separating white light into three unpolarized light channels, each channel being a different color;
   b) transmissive polymer dispersed nematic liquid crystal light modulating means in each of said light channels, said liquid crystal light modulating means being operative in one mode to transmit light and in another mode to scatter light; and
   c) addressing means for addressing said modulating means to selectively control scattering and transmission of said light beams;
   d) said three light channels being oriented so that light emitted from the channels converges to form a colored image at a distance from said modulating means.

9. A color projector operative in a transmissive mode for modulating a beam of white light comprising:
   a) means including at least two dichroic means aligned in the path of the beam of white light for separating the beam of white light into three unpolarized light channels, each channel being a different color;
   b) liquid crystal light modulating means in each of the light channels, the liquid crystal light modulating means being operative in one mode to transmit unpolarized light and in another mode to scatter unpolarized light;
   c) addressing means for addressing the liquid crystal light modulating means for selectively controlling scattering and transmission in the light channels to form three differently-colored virtual images; and
   d) means for combining the virtual images into a projection beam including at least two dichroic means aligned in the path of the projection beam.

10. A color projector according to claim 9 wherein the liquid crystal light modulating means comprises a transmissive polymer dispersed liquid crystal.

11. A low loss color projector operative in a transmissive mode to project colored light comprising:
   a) first optical means for separating white light into three unpolarized light beams, each beam being a different color;
   b) first liquid crystal light beam modulating means containing a transmissive polymer dispersed liquid crystal positioned downstream of said first optical means, said light beam modulating means being operative to scatter unpolarized light in one mode and to transmit unpolarized light in another mode;
   c) first addressing means for controlling the modulation of light by said light beam modulating means;
   d) second optical means for recombining said beams into an output beam downstream of said light beam modulating means;
   e) liquid crystal output beam modulating means containing a transmissive polymer dispersed liquid crystal positioned to receive and modulate said output beam, said output beam modulating means being operative to scatter light in one mode and to transmit light in another mode;
   f) a second addressing means for selectively controlling the transmission and scattering of light by said output beam modulating means.

12. A projector according to claim 11 including a photosensitive medium positioned in the output beam downstream of said output beam modulating means.

13. A projector according to claim 11 acting in a frame sequential mode wherein said first liquid crystal light beam modulating means comprises shuttering means operative in one mode to scatter one of said light beams and in another mode to transmit one of said light beams.

14. A low light loss color projector operative in a transmissive mode to project colored light comprising:
   a) first optical means for separating white light into three unpolarized light channels, each channel being a different color;
   b) transmissive polymer dispersed nematic liquid crystal light modulating means in each of said light channels, said liquid crystal light modulating means being operative in one mode to transmit light and in another mode to scatter light;
   c) addressing means for addressing said modulating means to selectively control scattering and transmission of light in said light channels to form three virtual images;
   d) second optical means for recombining the virtual images into a colored projection beam; and
   e) additional liquid crystal light modulating means arranged to modulate said colored projection beam, said additional liquid crystal light modulating means being operative in one mode to transmit light and in another mode to scatter light.

15. A low light loss color projector operative in a transmissive mode to project colored light comprising:
   a) first optical means for separating white light into three unpolarized light channels, each channel being a different color;
   b) transmissive polymer dispersed nematic liquid crytal light modulating means in each of said light channels, said liquid crystal light modulating means being operative in one mode to transmit light and in another mode to scatter light;
   c) addressing means for addressing said modulating means to selectively control scattering and transmission of light in said light channels to form three virtual images;
   d) second optical means for recombining the virtual images into a colored projection beam; and
   e) a photosensitive medium positioned in the colored projection beam.

16. A frame sequential projector comprising:
   a) a first optical system for separating white light into three light beams, each beam being a different color;
   b) three liquid crystal light shutters, one in each of said light beams, said liquid crystal light shutters being operative in one mode to scatter one of said light beams and in another mode to transmit said one of said light beams;
   c) first addressing means for addressing each of said light shutters to one of scatter and transmit said one of said light beams, thereby defining a colored output beam;
   d) a liquid crystal light modulator for receiving and modulating said colored output beam, said modulator being operative to transmit and scatter light;
   e) a second optical system downstream of said modulating means for directing said colored output beam onto the liquid crystal modulator; and
   f) second addressing means for addressing said liquid crystal light modulator to define an image by transmitting light from said output beam incident on one of an addressed or unaddressed portion of said light modulator and scattering light incident on another of said addressed and unaddressed portions of said light modulator.

17. A projector according to claim 16 wherein one of said first and second optical systems comprises a plurality of mirrors.

18. A projector according to claim 16 wherein one of said liquid crystal light shutter or said liquid crystal light modulator comprises a transmission polymer dispersed liquid crystal.

19. A low loss method for projecting a colored output beam comprising:
   a) separating white light into color and forming three unpolarized light beams so that each of said beams is a different color;
   b) selectively transmitting each of said beams through liquid crystal light modulating means, said liquid crystal light modulating means comprising a transmissive polymer dispersed liquid crystal and being operative in one mode to transmit light therethrough and in another mode to scatter light;
   c) addressing said liquid crystal light modulating means to selectively control scattering and transmitting of said light beams; and
   d) directing at least one of said beams onto a rotating mirror downstream of said liquid crystal light modulating means.

20. A low loss method for projecting a colored output beam comprising:
   a) separating white light into color and forming three unpolarized light beams so that each of said beams is a different color;
   b) selectively transmitting each of said beams through liquid crystal light modulating means, said liquid crystal light modulating means comprising a transmissive polymer dispersed liquid crystal and being operative in one mode to transmit light therethrough and in another mode to scatter light;
   c) addressing said liquid crystal light modulating means to selectively control scattering and transmitting of said light beams;
   d) directing the light beams onto mirrors including dichroic mirrors downstream of said liquid crystal light modulating means so that the light transmitted through said liquid crystal light modulating means is combined into a colored projection beam;
   e) directing the projection beam onto an additional liquid crystal light modulator, said additional liquid crystal light modulator comprising a transmissive polymer dispersed liquid crystal and
   f) addressing said additional liquid crystal light modulator to selectively transmit and scatter the projection beam.

21. A low loss method for projecting a colored output beam comprising:
   a) separating white light into color and forming three unpolarized light beams so that each of said beams is a different color;
   b) selectively transmitting each of said beams through a polymer dispersed liquid crytal light modulating means, said liquid crystal light modulating means being operative in one mode to transmit light therethrough and in another mode to scatter light; and c) addressing said liquid crystal light modulating means to selectively control scattering and transmitting of said light beams;
d) combining the light beams into a colored projection beam downstream of the liquid crystal light modulating means; and
e) positioning a photosensitive medium in the path of said projection beam.

22. A low loss method for projecting a colored output beam comprising:
   a) separating white light into color and forming three upolarized light beams so that each of said beams is a different color;
   b) selectively transmitting each of said beams through liquid crystal light modulating means, said liquid crystal light modulating means comprising a transmissive polymer dispersed liquid crystal and being operative in one mode to transmit light therethrough and in another mode to scatter light; and
   c) directing a laser onto a surface of said liquid crystal light modulating means to selectively control scattering and transmitting of said light beams.

23. A low loss method for projecting a colored output beam comprising:
   a) directing white light onto upstream mirrors including dichroic mirrors to form three unpolarized light beams of different color;
   b) directing the light beams onto filters to enhance the color of each light beam;
   c) selectively transmitting each of said beams through liquid crystal light modulating means, said liquid crystal light modulating means comprising a transmissive polymer dispersed liquid crystal and being operative in one mode to transmit light therethrough and in another mode to scatter light;
   d) addressing said liquid crystal light modulating means to selectively control scattering and transmitting of said light beams; and
   e) directing the light beams onto downstream mirrors including dichroic mirrors downstream of said filters so that the light transmitted through said liquid crystal light modulating means is combined into a colored projection beam.

* * * * *

UNITED STATES PATENT AND TRADEMARK OFFICE
CERTIFICATE OF CORRECTION

PATENT NO. : 5,040,877
DATED : August 20, 1991
INVENTOR(S) : Robert Blinc et al.

It is certified that error appears in the above-identified patent and that said Letters Patent is hereby corrected as shown below:

Col. 3, line 64, delete "6,685,771 and 6,688,900" and insert --4,685,771 and 4,688,900--.

Claim 1, col. 7, line 23, delete "and unpolarized light" and insert:

-- ii) said liquid crystal light modulating means being operative in one mode to transmit unpolarized light and in another mode to scatter unpolarized light;--

Claim 18, col. 10, line 12, delete "shutter" and insert --shutters--.

Claim 18, col. 10, line 13, delete "transmission" and insert --transmissive--.

Claim 22, col. 11, line 12, delete "upolarized" and insert --unpolarized--.

Signed and Sealed this

Eighteenth Day of May, 1993

Attest:

MICHAEL K. KIRK

*Attesting Officer*  *Acting Commissioner of Patents and Trademarks*